(12) United States Patent
Handley et al.

(10) Patent No.: US 11,919,830 B2
(45) Date of Patent: Mar. 5, 2024

(54) MATERIALS SUITABLE AS SUBSTITUTES FOR PEAT MOSSES AND PROCESSES AND APPARATUS THEREFOR

(71) Applicant: PITTMOSS LLC, Ambridge, PA (US)

(72) Inventors: Mont Andrew Handley, Pittsburgh, PA (US); Matt Collins Knapp, Pittsburgh, PA (US); Mark David Goldman, Sewickley, PA (US)

(73) Assignee: PITTMOSS LLC, Ambridge, PA (US)

( * ) Notice: Subject to any disclaimer, the term of this patent is extended or adjusted under 35 U.S.C. 154(b) by 158 days.

(21) Appl. No.: 17/521,022

(22) Filed: Nov. 8, 2021

(65) Prior Publication Data

US 2022/0055959 A1 Feb. 24, 2022

Related U.S. Application Data

(62) Division of application No. 14/856,663, filed on Sep. 17, 2015.
(Continued)

(51) Int. Cl.
*C05F 11/00* (2006.01)
*C05G 3/80* (2020.01)
(Continued)

(52) U.S. Cl.
CPC ............... *C05F 11/00* (2013.01); *C05G 3/80* (2020.02); *C05G 5/12* (2020.02); *C09K 17/16* (2013.01); *C09K 17/50* (2013.01); *C09K 17/52* (2013.01)

(58) Field of Classification Search
None
See application file for complete search history.

(56) References Cited

U.S. PATENT DOCUMENTS 550,545 A * 11/1895 Thompson ............... C05F 11/00
71/8
619,633 A * 2/1899 Thompson ............... C05F 11/00
71/48
(Continued)

FOREIGN PATENT DOCUMENTS

DE       4040771 C1 *  7/1992  ............ C05F 11/00
WO    WO 95/03371    *  2/1995  ............ C09K 17/00
WO  WO 2014/143716 A1 *  9/2014  ............. A01G 1/00

*Primary Examiner* — Wayne A Langel
(74) *Attorney, Agent, or Firm* — Hartman Global IP Law; Gary M. Hartman; Domenica N. S. Hartman

(57) ABSTRACT

Processes capable of producing bulk materials suitable for use by the horticulture industry, resulting bulk materials produced thereby, and applications for these processes and materials. Preferred bulk materials have physical properties similar to peat moss and comprise individual materials, each at least partially having a twisted, curled, clumped and rolled structure. The individual materials may further comprise small granular particles dispersed throughout the twisted, curled, clumped and rolled structure. The individual materials may be rolled fibers such that the bulk material has physical properties similar to sphagnum peat moss so as to be particularly suitable as, for example, a soil conditioner, an absorbent material, a chemical carrier, or a filtering material. Alternatively, the individual materials may be rolled particles such that the bulk material has physical properties similar to milled peat moss so as to be particularly suitable as propagation media.

20 Claims, 9 Drawing Sheets

Related U.S. Application Data

(60) Provisional application No. 62/060,911, filed on Oct. 7, 2014.

(51) Int. Cl.
  *C05G 5/12* (2020.01)
  *C09K 17/16* (2006.01)
  *C09K 17/50* (2006.01)
  *C09K 17/52* (2006.01)

(56) References Cited

U.S. PATENT DOCUMENTS

| | | | | |
|---|---|---|---|---|
| 4,414,776 A | * | 11/1983 | Ball | C09K 17/52 47/9 |
| 4,621,011 A | * | 11/1986 | Fleischer | C08L 1/02 428/221 |
| 4,997,469 A | * | 3/1991 | Moore | C05F 1/00 71/901 |
| 5,057,141 A | * | 10/1991 | Rodriquez-Kabana | C05F 1/00 71/26 |
| 5,443,613 A | * | 8/1995 | Robinson | C05F 9/00 71/21 |
| 5,510,310 A | * | 4/1996 | Manning | A01K 1/0155 502/412 |
| 5,653,053 A | * | 8/1997 | Handley | C05F 1/005 47/1.01 R |
| 2007/0131010 A1 | * | 6/2007 | Binder | C05F 11/00 71/23 |
| 2013/0150477 A1 | * | 6/2013 | Celia | C05G 5/40 521/170 |
| 2020/0299208 A1 | * | 9/2020 | Norden | C09K 17/32 |

* cited by examiner

MATERIALS SUITABLE AS SUBSTITUTES FOR PEAT MOSSES AND PROCESSES AND APPARATUS THEREFOR

This is a division patent application of co-pending U.S. patent application Ser. No. 14/856,663 filed Sep. 17, 2015, which claims the benefit of U.S. Provisional Application No. 62/060,911 filed Oct. 7, 2014. The contents of these prior patent documents are incorporated herein by reference.

BACKGROUND OF THE INVENTION

The present invention generally relates to materials of types used to improve the aeration and/or moisture retention in soils. More particularly, this invention relates to materials formed from paper-type materials and capable of exhibiting properties that enable their use as substitutes for peat moss.

The use of peat moss, and particularly sphagnum peat moss, for the purpose of conditioning soils is widely practiced by hobbyists and professional gardeners and growers alike. Peat moss is widely used to pack and pot plants, with sphagnum peat moss typically being most preferred by gardeners and growers. When mixed with soil, sphagnum peat moss serves to aerate the soil while simultaneously enhancing moisture retention, both of which are highly desirable soil qualities for starting and growing plants.

Sphagnum peat moss (or simply, sphagnum peat) can be found in bogs predominated by sphagnum moss, a genus of moss. Sphagnum peat that is found in the upper layers or more recent growth has not yet had the chance to decay or breakdown, and as a result has desirable characteristics of being long fibered with irregular, clustered branchlets and spherical capsules, which contribute to the ability of sphagnum peat moss to retain moisture when mixed with soil. However, the availability of sphagnum peat moss in the U.S. can be relatively poor as a result of being a limited resource, and sphagnum peat moss accounts for only a fraction of all peat moss produced in the U.S.

In view of increasing environmental concerns, substitutes for various types of natural soil conditioners have been sought by the agricultural industry, with many approaches utilizing recycled materials in order to simultaneously provide a use for solid waste materials. For example, U.S. Pat. No. 3,876,411 to Fowler discloses a mulch which is composed of waste organic materials and latex materials that are byproducts of the manufacturing of polymers. Cellulosic materials such as waste paper have generally been identified as suitable materials for mulches, as recognized by U.S. Pat. No. 4,067,140 to Thomas, U.S. Pat. No. 4,123,489 to Kelley, U.S. Pat. No. 4,297,810 to Hansford, and U.S. Pat. Nos. 4,357,780 and 4,414,776 to Ball. Notably, the above patent documents are generally directed to mulches which, by definition, are intended to be spread on the surface of the soil around plants in order to prevent the evaporation of water from the soil and prevent the plant's roots from freezing. Consequently, these mulches are generally described as having a fibrous character which can be spread or sprayed as an aqueous slurry, or as forming a fibrous web that can be placed in sheet form on the ground. Therefore, these compositions are not directed toward finding a substitute for peat moss, nor are these compositions generally suitable for use as such, primarily due to their large conglomerate nature which inhibits their ability to mix well into the soil.

The horticulture industry has utilized grades in describing peat moss used for various applications. Long-fiber peat moss such as sphagnum is considered to be a premium variety for soil conditioning. It generally is not used for other applications, for example, propagation, seed starting and/or rooting applications, which have specific requirements for moisture retention. Instead, manufacturers of propagation media, including propagation plugs, utilize short fibered peat that will more easily flow through various mechanical apparatus in the production process. Larger fiber materials, including peat mosses, can result in difficult handling and inadequate filling of containers. For commercial and private growers who grow seedlings, a small fiber material more easily fits into small seed or plug trays, whereas larger fiber material, such as sphagnum peat mosses, can cause bridging of the material above seedling tray cavities. With these considerations, the current industry standards for seed starting applications include vermiculite, milled peat moss, and sphagnum peat moss found in lower, more decomposed strata of bogs that contain sphagnum peat moss.

In view of the above, it would be advantageous to provide soil conditioning substitutes for sphagnum peat moss that would exhibit the desired characteristics of this type of moss, such as moisture retention and the ability to readily blend into the soil to provide aeration. It would also be advantageous to provide propagation media substitutes for milled peat moss that would exhibit desirable characteristics, such as moisture retention and the ability to be readily manufactured and used.

BRIEF DESCRIPTION OF THE INVENTION

The present invention provides processes capable of producing materials suitable for use by the horticulture industry, materials produced thereby, and applications for these processes and materials.

According to one aspect of the invention, a bulk material is provided having physical properties similar to peat moss, and the bulk material comprises individual materials, each at least partially having a twisted, curled, clumped and rolled structure. The individual materials may further comprise small granular particles (hereafter referred to as SGPs) dispersed throughout the twisted, curled, clumped and rolled structure. The individual materials may be rolled fibers such that the bulk material has physical properties similar to sphagnum peat moss so as to be particularly suitable as a replacement for sphagnum products when used as, for example, soil conditioners, absorbent materials, chemical carriers, and/or filtering materials (media). Alternatively, the individual materials may be rolled particles such that the bulk material has physical properties similar to milled peat moss so as to be particularly suitable as propagation media.

According to another aspect of the invention, a process and an apparatus are provided for forming the bulk material. The process includes producing a fibrous fluff material, moistening the fluff material and adding small grained particles (SGPs) to the fluff material, and mixing the fluff material and the SGPs so that the SGPs aid in grinding the fluff material and thereby produces individual materials in the form of twisted, curled, clumped and rolled fibers or twisted, curled, clumped and rolled particles that are sufficiently dry to permit separation of the fibers/particles. A sufficient amount of liquid can be added to moisten the fluff material to preferentially produce the rolled fibers but not enough to produce the rolled particles. Alternatively, a relatively greater amount of liquid can be added to the fluff material to preferentially produce the rolled particles instead of rolled fibers.

Significant advantages of certain embodiments of the invention include the ability to provide substitutes for sphagnum peat moss that exhibit certain desirable characteristics of this type of moss, such as moisture retention when used as a soil conditioner. Significant advantages of certain other embodiments of the invention include the ability to provide propagation media substitutes that would exhibit desirable characteristics, such as moisture retention, air exchange and nutrient-holding ability, and the ability to be readily manufactured and used.

Other aspects and advantages of this invention will be further appreciated from the following detailed description.

DETAILED DESCRIPTION OF THE INVENTION

Figure 1:
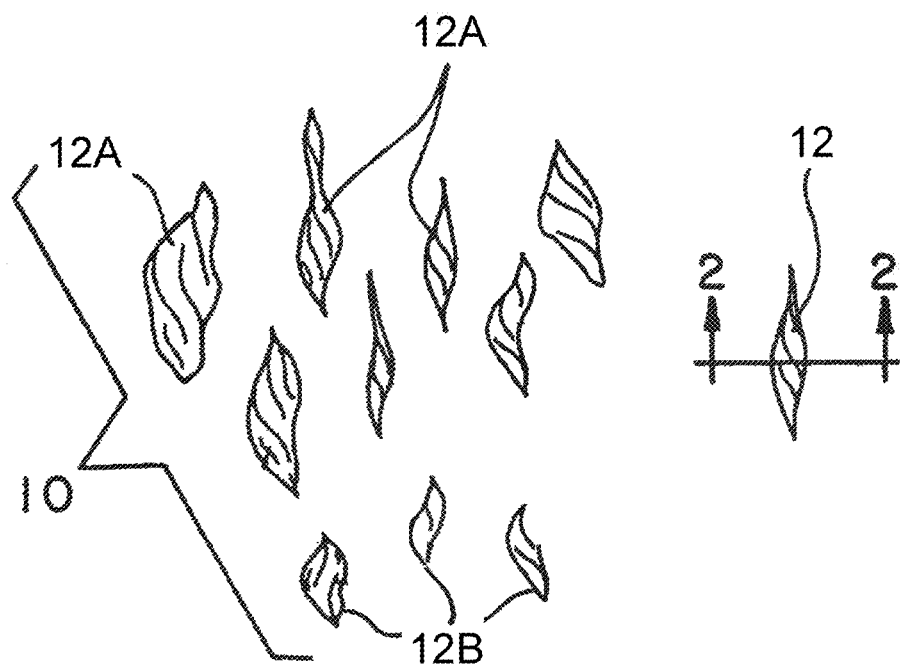
FIG. 1 represents the general appearance of individual fibers and particles of a bulk material in accordance with certain embodiments of this invention.

According to the present invention, bulk materials are provided that are suitable for use in the horticulture industry. The bulk materials include soil conditioning media, absorbent materials, chemical carriers, and filtering materials that are suitable as direct substitutes for peat moss and, in preferred embodiments, sphagnum peat moss, and media that are suitable for propagation, seed starting, and/or rooting applications. The bulk materials can be primarily produced from paper products, nonlimiting examples of which are waste paper products including newspapers, which are processed to form small twisted, curled, clumped and rolled fibers or particles, as defined below. The bulk materials can be produced to sufficiently exhibit the textural and physical properties of peat moss, in some cases sphagnum peat moss, such that they can be readily mixed into soil in order to promote moisture retention and enhance aeration in the soil, or used as media for propagation, seed starting and/or rooting applications. Furthermore, the bulk materials preferably contain SGPs of one or more granular materials as a constituent, for example, bone meal alone or in combination with one or more other granular materials. As used herein, an SGP is a small grained particle that is smaller than the paper products used to produce the bulk materials and is abrasive to the paper products. The paper products and SGPs can be processed such that the SGPs aid in the formation of the twisted, curled, clumped and rolled fibers or particles (for convenience, hereinafter referred to simply as rolled fibers and rolled particles, respectively).

For purposes of this invention, SGPs can be composed of any solid material that remains solid or will fragment or dissolve during processing or over time in the use of the bulk materials. The solid material and SGPs formed thereof can be ground, sized, formulated, and/or synthesized naturals or manufactured materials. As an example, SGPs may be solid materials derived from processed agricultural products, by-products, or waste from processing such as (but not limited to) those of the type derived from food, fiber, fuel, fisheries, forestry and other production and processing systems. These solid materials include but are not limited to many agricultural products and by-products; as nonlimiting examples, bone meal, hoof and horn materials, ground shells, ground pits or seeds, coffee grounds, chaff, hulls, brewery waste and granulated products of fermenting and fuel production, ground shells, ground or processed forestry products, and combinations thereof. SGPs may also be solid materials derived from mining and earthen particles that have been processed to formulate granules. Minerals and ores of all types can range in size from sand to silt and clay, and may be reconstituted to granules that have a desired particle size as discussed below. These solid materials include but are not limited to calcined clay, fused earth products, pumice, volcanic ash, perlite, vermiculite, gypsum, lime, fertilizers, coal fines, rock dust, and any combinations thereof. SGPs may also be solid materials derived from recycled products that have been processed to formulate granules of the desired particle size. Nonlimiting examples of waste materials that can be used include materials from manufacturing and processing, construction, excavation, food preparation and food delivery services, and any other waste materials that can be milled processed or granulated to the desired particle sizes. These solid materials include but are not limited to ground glass, concrete, asphalt, and metal, food service containers, solidified fibers, plastics, and processed plastics, and various other waste and recycled products. SGPs may also be any solid material that will remain solid for a part of the processing and/or into the application of the finished material. In view of the foregoing, the source and formulation of the SGP can vary depending on the properties and desired application of the bulk material. In some instances, the SGP can be selected to alter the nutrient properties of the bulk material and therefore the ability of the material to promote plant growth. As a nonlimiting but in some instances preferred SGP, bone meal (calcium phosphate) advantageously contributes fertilizer-grade phosphorus and nutrient-grade calcium to the bulk material.

The bulk materials of this invention are able to utilize waste paper that typically comprises lignin and cellulose, such as newsprint, which has been shredded to form small shredded fragments, more preferably a fluff material referred to herein as a cellulose fluff material. Vigorous blending with the SGPs and a controlled amount of liquid transforms the fluff material into the above-noted rolled fibers or rolled particles. The rolled fibers or rolled particles have a sufficiently small size in order to exhibit desired physical characteristics, preferably simulating either sphagnum peat moss or milled peat moss, depending on the intended application, for example, as a soil conditioner, absorbent material, chemical carrier, filtering material, or propagation media. The SGPs can become distributed within the rolled fibers or rolled particles and may optionally form a layer that individually and substantially encases each of the rolled fibers or rolled particles. For example, if present as a cohesive layer, agricultural grade bone meal can assist in the retention of moisture in each of the rolled fibers or rolled particles, and may also contribute fertilizer, for example, fertilizer grade phosphorus. The bulk materials (for example, soil conditioner, absorbent material, chemical carrier, filtering material or propagation media are thereby composed of a mass of individual rolled fibers or rolled particles, and are preferably characterized by a texture and a moisture-retention capability which is comparable to that of either sphagnum peat moss or peat moss, including milled peat moss.

Figure 2:
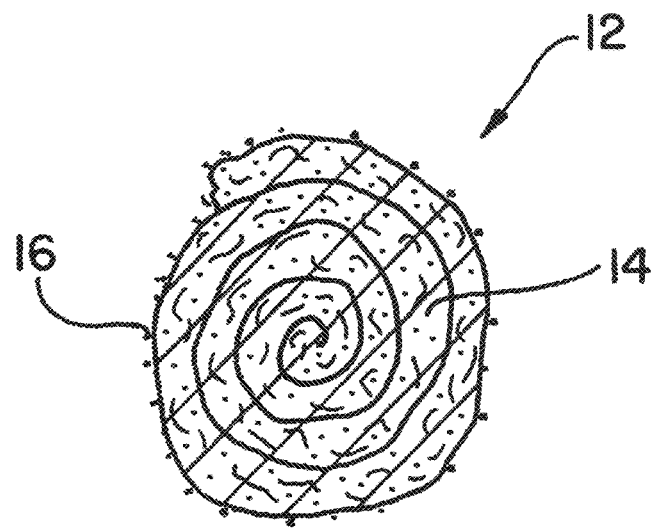
FIG. 2 is a cross-sectional view of an individual fiber or particle represented in FIG. 1.

The physical characteristics of the materials which enable the above are generally represented in FIGS. 1 and 2, which illustrate a bulk material 10 as individual materials (pieces or bodies) 12 having the aforementioned "rolled" form, more particularly, a twisted, curled, and/or-clumped shape and a rolled structure. Some of the materials 12 have a more elongate shape, referred to herein as the rolled fibers 12A, whereas the remainder are smaller and referred to herein as the rolled particles 12B, in some instances having a more spherical shape than the rolled fibers 12A. The rolled fibers 12A and rolled particles 12B can be selectively produced by adjusting the processing method by which they are created, as will be described below. The rolled particles 12B have a smaller, tighter, denser fibrous structure that is particularly desirable for use in propagation, seed starting and/or rooting applications in small seed starting cells or any other application as a substitute for milled peat moss or similar material. In contrast, the rolled fibers 12A have a looser, loftier fibrous structure that is particularly desirable for use as a soil conditioner, absorbent material, chemical carrier, or filtering material, filling large containers for bedding plants and hanging baskets, or any other application as a substitute for sphagnum peat moss or similar material. Notably, the smaller size of the rolled particles 12B enables a bulk material 10 of the rolled particles 12B to more easily flow through various mechanical equipment that might be used in a production process to produce propagation plugs, or if used to fill small seedling tray cavities.

Generally, it is preferable that the largest dimensions (lengths) of the rolled fibers 12A and rolled particles 12B do not exceed about eight millimeters, for example, about one millimeter up to a maximum dimension of about six to eight millimeters, in order to ensure that they can be readily mixed with soil. In practice, for example, at least some and preferably most of the rolled fibers 12A are greater than two millimeters and up to about five millimeters in length and, as evident from FIG. 1, the rolled particles 12B tend to be smaller than the rolled fibers 12A, for example, at least some if not most are less than 2.5 millimeters in length. As such, the maximum dimensions for the rolled fibers 12A and rolled particles 12B are believed to result in both forms of the material 10 being physically distinguishable from traditional mulch materials. The rolled fibers 12A and rolled particles 12B can preferably be readily mixed with shovels or trowels typically used by both commercial growers and home gardeners. However, it is foreseeable that larger sized rolled fibers 12A and rolled particles 12B may be suitable under some circumstances.

As shown in FIG. 2, each individual rolled fiber 12A and particle 12B is generally composed of a core 14 formed almost entirely of cellulose fiber. SGPs 16 of a granular material, for example, bone meal, are represented as being dispersed throughout the fiber/particle material 12. The SGPs 16 may optionally form a cohesive layer that substantially encases the rolled fiber 12A or rolled particle 12B. The manner in which the rolled fibers 12A and rolled particles 12B are produced preferably yields the generally rolled or coiled structure shown for the core 14, while the SGPs 16 may be absorbed somewhat into the core 14, particularly between overlapping portions of the core 14 (shown as rolled and coiled in FIG. 2). The source of the cellulose fiber can vary considerably. Cellulose insulation has been used, though waste paper, particularly newsprint, is preferred due to availability, relatively low cost, and ability to be readily processed to form the desired rolled fibers 12A and rolled particles 12B shown in FIG. 1. For example, the processing of newsprint can be controlled to readily produce the relatively loose rolled fibers 12A or the more tightly wound rolled particles 12B represented in FIG. 1. The rolled structure of the core 14 enhances the ability of the rolled fibers 12A and rolled particles 12B to retain moisture, which is a desirable characteristic of peat moss and any composition intended as a replacement for peat moss.

Figure 3:
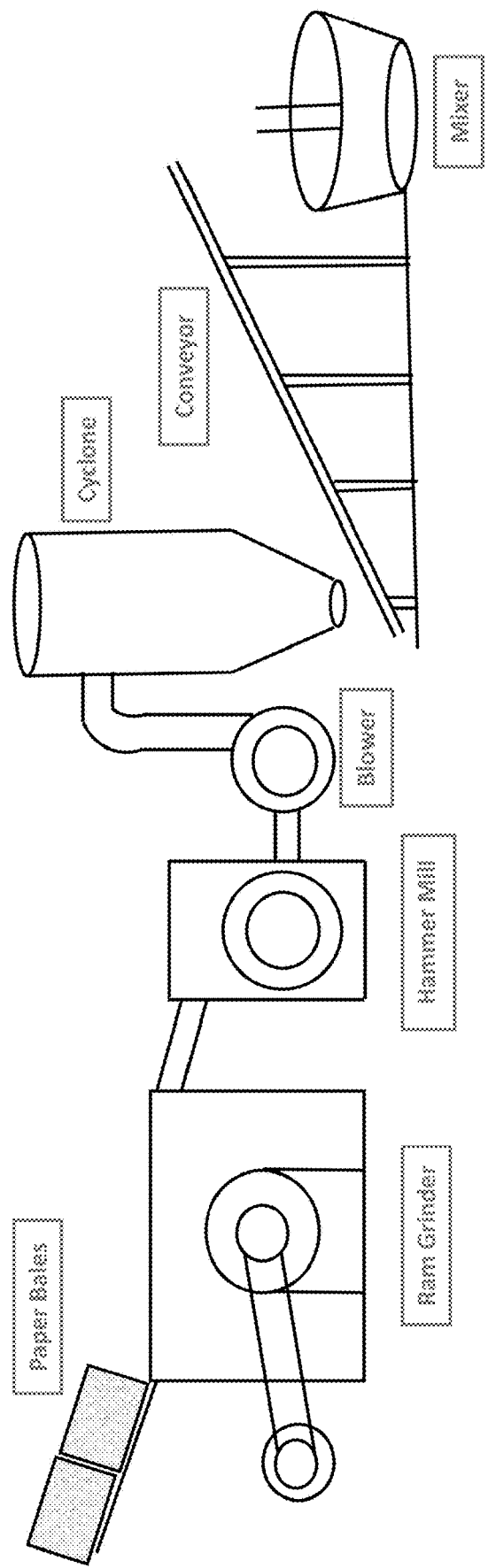
FIG. 3 represents a processing system of a type suitable for producing the fibers and particles of FIGS. 1 and 2.

Processes that are believed to be preferred for the production of the materials 10 are highly advantageous from the standpoint of material and processing costs. As represented in FIG. 3, the processes primarily include a shredding operation in which paper such as newsprint is reduced to cellulose particles or fluff material. In FIG. 3, such a shredding operation may start with bales of paper that are processed by a ram grinder and then a hammer mill, resulting in the cellulose fluff material that is blown into a cyclone/dust collector to remove excessively fine particles. The fluff material is then gently deposited onto a conveyor and fed into a finish mixer. Suitable ram grinders, hammer mills, cyclone/dust collectors, and conveyors are well known and will not be discussed in any further details.

Within the mixer, the cellulose fluff material is combined with water, the SGPs (for example, bone meal), and optionally any desired colorant(s) and/or additional additives. Within the mixer, the fluff material is moistened and, in a process that is believed to involve the action of the SGPs, substantially transformed into the rolled fibers 12A or rolled particles 12B. Sufficient moisture is present in the mixer such that the SGPs 16 form a slurry that promotes grinding of the fluff material, and may optionally form the aforementioned cohesive layer that substantially covers the individual rolled fibers 12A or rolled particles 12B. In particular, the SGPs 16 are believed to have a significant role as an abrasive agent in the mixing process. The SGPs 16 appear to play a significant role in breaking down the cellulose fluff material as the mixture of fluff material and SGPs 16 is ground/milled beneath a lowermost blade of the mixer. Mixing preferably continues for a duration sufficient to permit separation of the rolled fibers 12A or rolled particles 12B, such that a mass of the rolled fibers 12A or rolled particles 12B is characterized by a desirable texture and moisture-retention capability. If present, the cohesive layer of bone meal on each rolled fiber 12A or rolled particle 12B assists in the retention of moisture within each rolled fiber 12A or rolled particle 12B.

Figure 4:
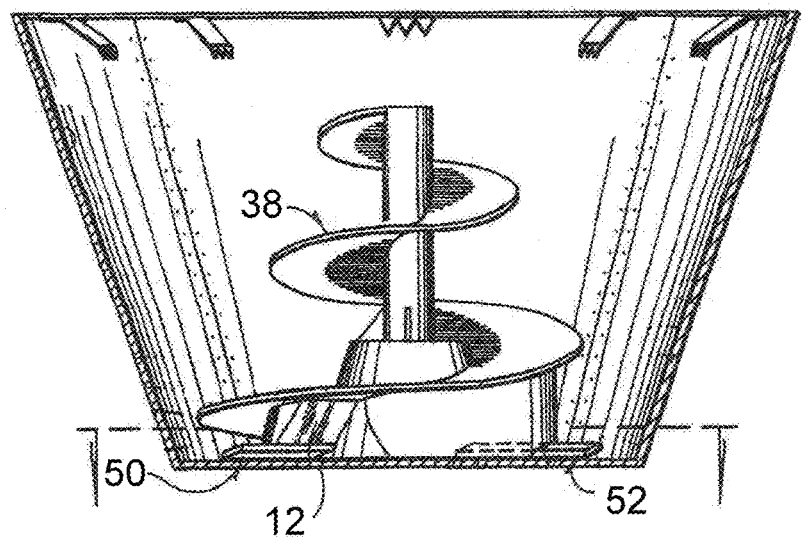
FIGS. 4 and 5 are side and top views of a prior art mixer disclosed in U.S. Pat. No. 5,647,665.
Figure 5:
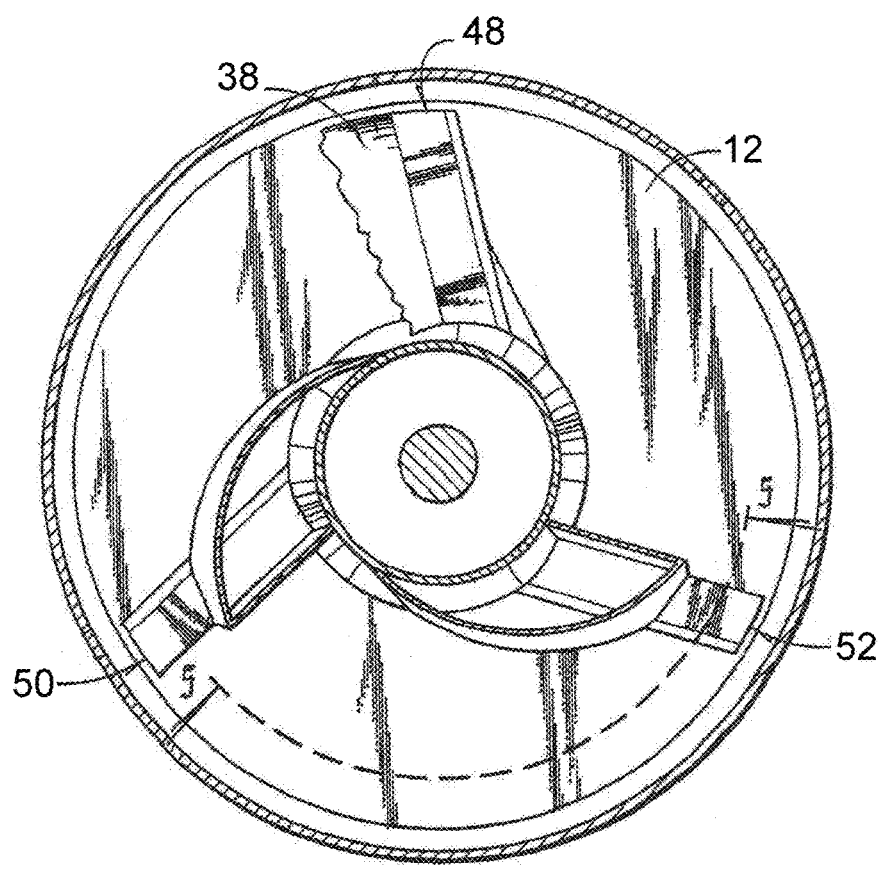
Figure 6:
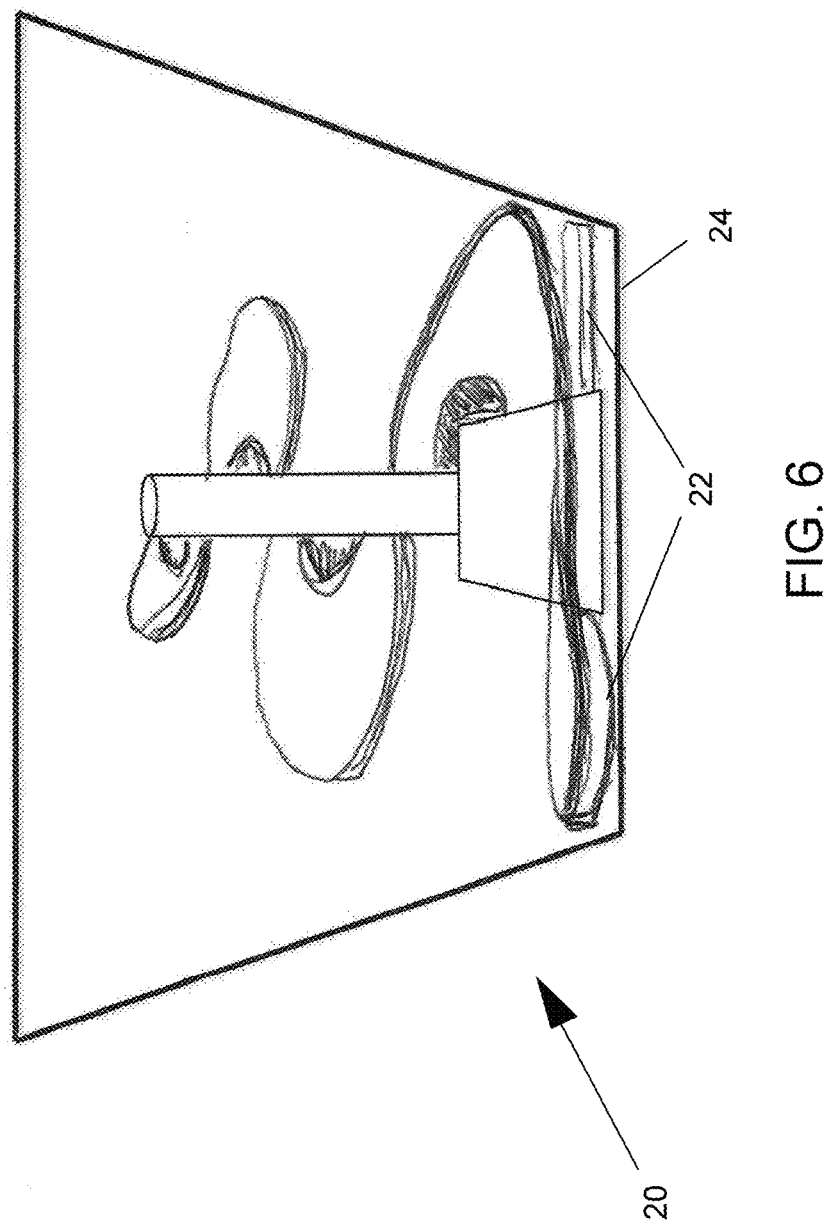
FIG. 6 shows a mixer similar to that of FIGS. 4 and 5, but with a modified blade at its lowermost extent.
Figure 7:
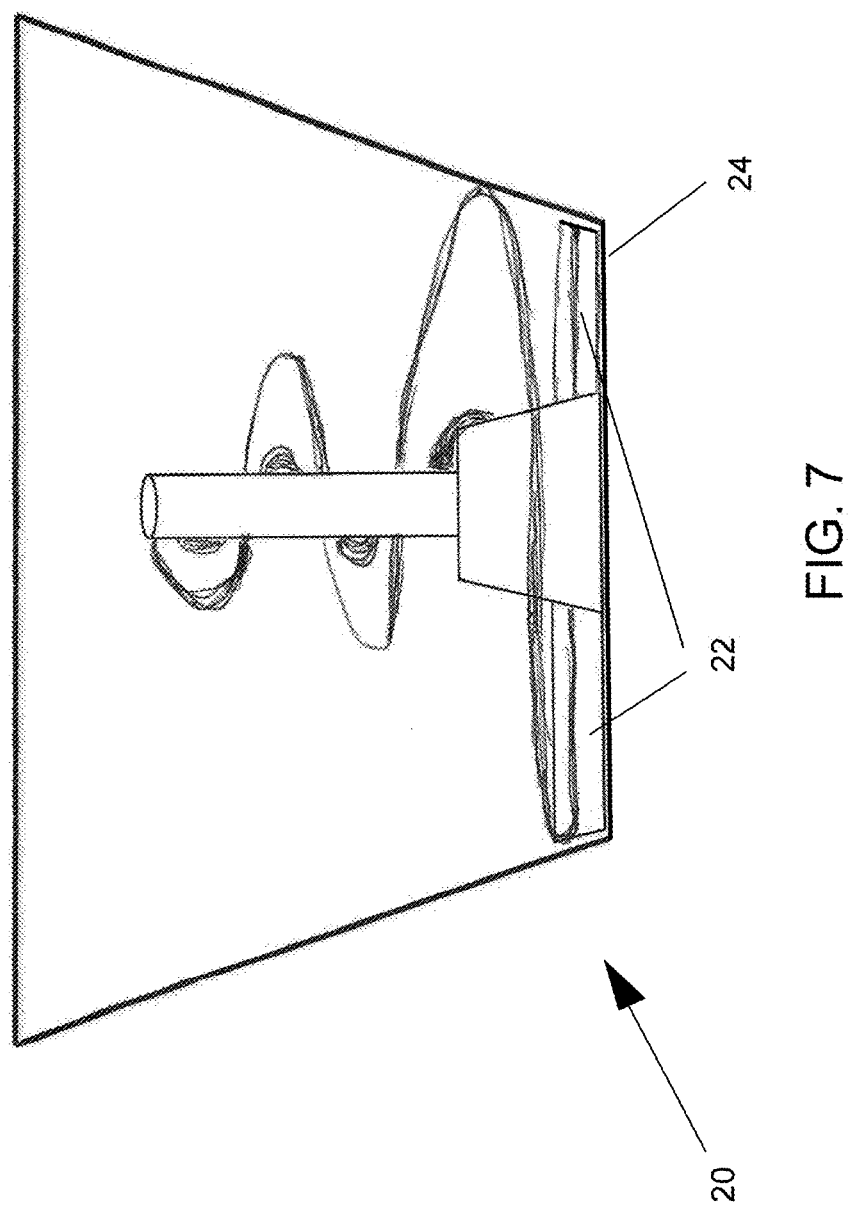
FIG. 7 shows a mixer similar to that of FIG. 6, but with further modified blades at its lowermost extent.

An example of a known type of mixer is represented in FIGS. 4 and 5. The mixer, which is disclosed in U.S. Pat. No. 5,647,665, is intended as a feed mixer, for example, to produce silage for cattle. FIGS. 4 and 5 show the mixer as having a corkscrew-like auger 38 and lowermost grader blades 48, 50 and 52, the latter of which are spaced apart from the floor 12 of the mixer. FIGS. 6 and 7 represent mixers 20 that are similar to that of FIGS. 4 and 5, but modified such that at least a portion of at least one of their lowermost blades (sweep bars or swing arms) 22 is in closer proximity to the floor 24 of the mixer 20 than that represented in FIGS. 4 and 5. The mixer 20 in FIG. 6 has at least one bent lowermost blade 22 having a portion in closer proximity to the floor 24 than the remainder of the blade 22, whereas the entirety of each blade 22 of the mixer 20 in FIG.

Figure 8:
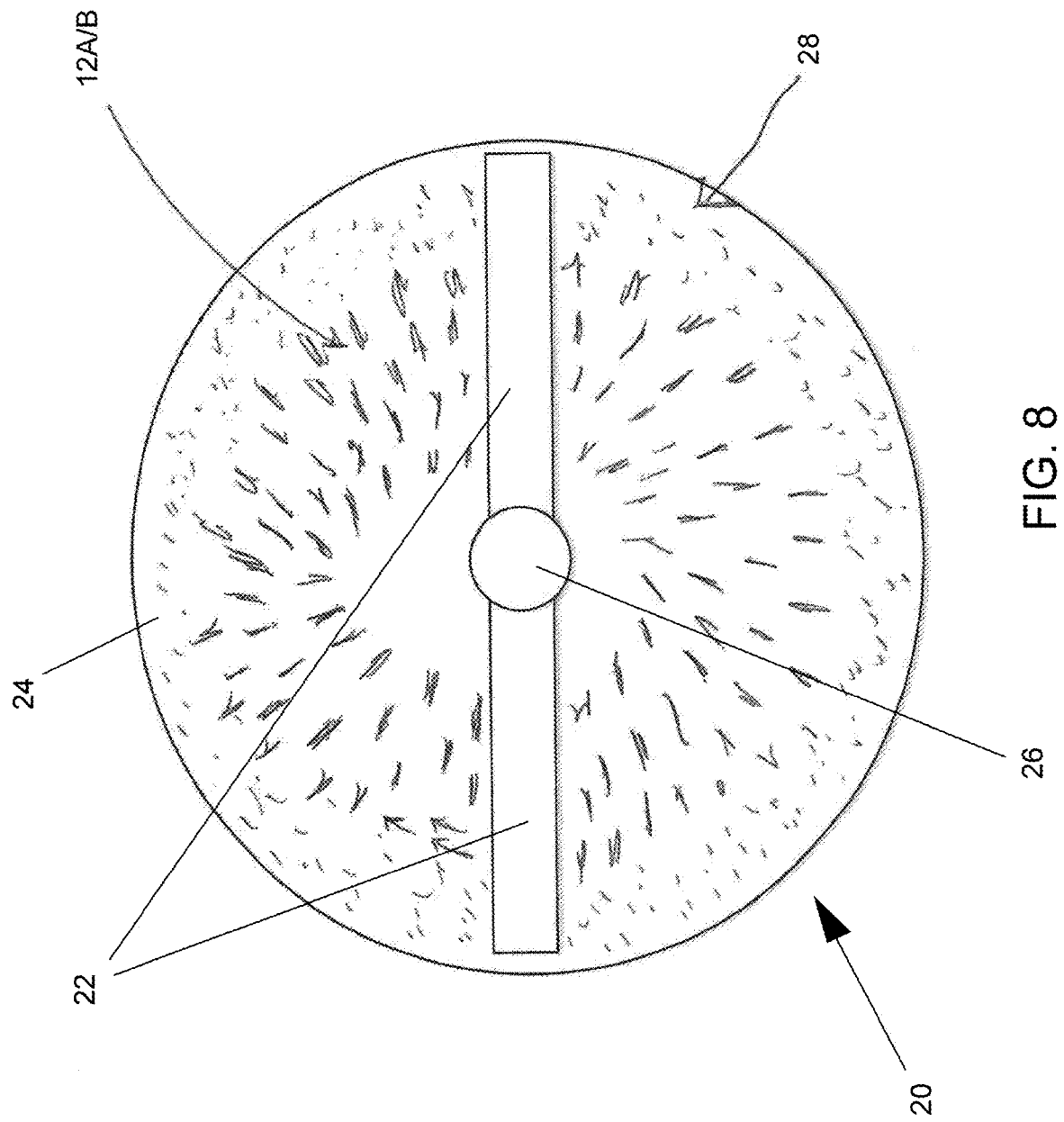
FIG. 8 represents a top view of the mixer of FIG. 6 and showing materials produced by the mixer.

7 has roughly the same tight clearance with the floor 24 as the bent portion of the blade 22 of FIG. 6. The tight clearance is believed to be a key factor in the manipulation of the cellulose fluff material into the desired rolled fibers 12A or rolled particles 12B, as longer chains of fibers/particles appeared beneath the bend with each rotation of a mixer configured similar to the mixer 20 of FIG. 6. In that particular embodiment of the mixer 20, at least one of its lowermost blades 22 had a downward bend spaced apart from the radial outermost end of the blade 22, roughly starting about 5 to 6 inches (about 7.5 to 15 cm) from the radial outermost end of the blade 22 and continuing about 12 to 14 inches (about 30 to 35 cm) toward the center of the shaft 26 on which the auger and blades 22 were mounted. In investigations leading to the present invention, the mixer configured as shown in FIG. 6 appeared to exclusively produce rolled fibers 12A or rolled particles 12B beneath the bend in its lowermost blade 22, as represented in FIG. 8. In contrast, beneath portions of the blades 22 spaced farther from the floor 24 of the mixer 20, only small cellulose particles 28 were observed but no formation of rolled fibers 12A or rolled particles 12B. The cellulose particles 28 visually appeared as if they have not yet been affected or manipulated by the blades 22. Tighter clearances as described above were also tested in a closed batch ribbon mixer and appeared to duplicate the desired characteristics of rolled fibers 12A or rolled particles 12B that were produced with the mixer 20 of FIG. 6.

The twisted, clumped and rolled structures of the rolled fibers 12A and rolled particles 12B are advantageous when mixing the material 10 into soil, in that the rolled fibers 12A or rolled particles 12B will more readily mix into the soil than would shredded or fibrous particles, yet the rolled fibers 12A and rolled particles 12B also retain some of the advantages of a fibrous structure as a result of being formed from fibrous fluff material. In particular, it is believed that the internal fibrous nature of the rolled fibers 12A and rolled particles 12B, as opposed to their external clumped structure, serves to extend the longevity of the cellulosic food for microbes within the soil.

As is known in the art, bone meal is a product made by grinding animal bones, with commercially available bone meal generally containing tricalcium phosphate and phosphoric acid, with smaller amounts of ammonia also being present. Bone meal is believed to be preferred as the SGPs 16 for this invention and is preferably of the type designated as fertilizer grade, which is raw bone meal that has not been previously steamed, though steamed bone meal, generally designated as feed grade bone meal, could also be used. In some embodiments, the SGPs 16 of bone meal may constitute a weight percent of as low as about 0.2% to as high as about 35% of each of the rolled fibers 12A or rolled particles 12B, based on the mixing rate of bone meal with the fluff material, though it is entirely foreseeable that greater or lesser amounts of bone meal could be utilized and yet obtain rolled fibers 12A and rolled particles 12B suitable for use under some conditions. Furthermore, part or all of the bone meal could be replaced with another granular material that meets the definition herein of an SGP, a notable but non-limiting example of which is sand (reported on the Wentworth Scale to have a particle size of $1/16$ to 1 mm). The SGP type and the final moisture content of the bulk material may vary considerably to meet specific applications. The resulting bulk material 10 may have a density as low as about 50 grams per liter to as high as about 1500 grams per liter. A preferred range for use as a substitute for common peat moss or milled peat applications is believed to be from about 70 to about 400 grams per liter, which advantageously is comparable to that of peat moss as used for agricultural purposes.

As a result of the above structure, the bulk materials 10 of this invention are capable of exhibiting textural and moisture-retention characteristics very similar to that of sphagnum peat moss or milled peat moss, in that the rolled fibers 12A and rolled particles 12B are suitable substitutes for, respectively, sphagnum peat moss as a soil conditioning agent or milled peat moss as a propagation media. The materials 10 may also provide benefits beyond those of sphagnum and milled peat moss, for example, as a result of containing bone meal as the SGP, which contributes phosphorus to the soil for stimulating plant growth. Furthermore, if part or all of the bone meal is replaced with another SGP and/or an additional additive is combined with the cellulose fluff material and SGP, the SGP and/or additive can be selected to alter the nutrient properties and/or non-nutrient properties (physical, chemical, and biological) of the materials 10 (as examples, plant protecting materials such as bio-stimulants, growth regulators, natural and chemical pesticides, fungal and bacterial inoculants, etc.), and thereby enhance the ability of the material 10 to promote plant growth.

Processes by which either the rolled fibers 12A or rolled particles 12B can be selectively produced generally relate to the amount of liquid used in the process. Typically the liquid will be water that is added to the mixer 20 in an amount sufficient to moisten the cellulose fluff material and SGPs 16, though it is foreseeable that other liquids could be used as long as the liquid is biologically compatible with the intended purpose of the bulk material 10. As previously noted, the SGPs 16 preferably have an abrasive effect to promote the breaking down of the cellulose fluff material as the mix of cellulose fluff material and SGPs 16 is ground and/or milled beneath the lowermost blade(s) 22 of the mixer 20. Before, during or after the addition of SGPs 16, additional liquid can be introduced into the mixer 20, as well as any coloring agent or other desired liquid or solid additive. However, a relatively greater amount of moisture is required to produce the rolled particles 12B, which results in the creation of a slurry with the cellulose fluff material that promotes the formation of the desired rolled particles 12B. After a period of continuous mixing, the cellulose fluff material is transformed into a substantially homogenous mass of rolled fibers 12A or rolled particles 12B.

Once the physical shape of the rolled fibers 12A or rolled particles 12B is acquired, mixing may continue for a duration sufficient to dry the rolled fibers 12A or rolled particles 12B, for example, sufficient to permit the rolled fibers 12A or rolled particles 12B to be freely separated and subsequently handled for packaging. Bulk materials 10 formed of either the rolled fibers 12A or rolled particles 12B as described above have been evaluated for water absorption, water retention and aeration capacity, with excellent results. Commercial trials have also shown that these bulk materials 10 are able to achieve better propagation success rates than vermiculite and milled peat moss.

Figure 10:
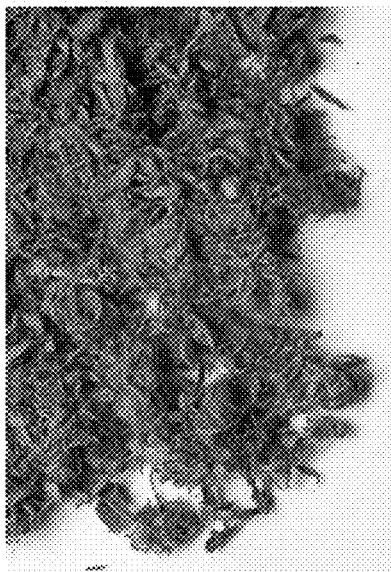
Figure 12:
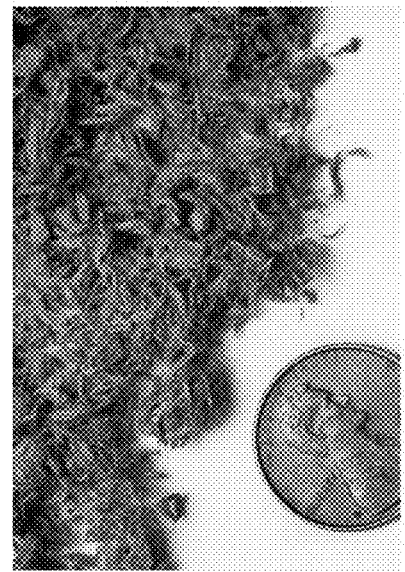
Figure 9:
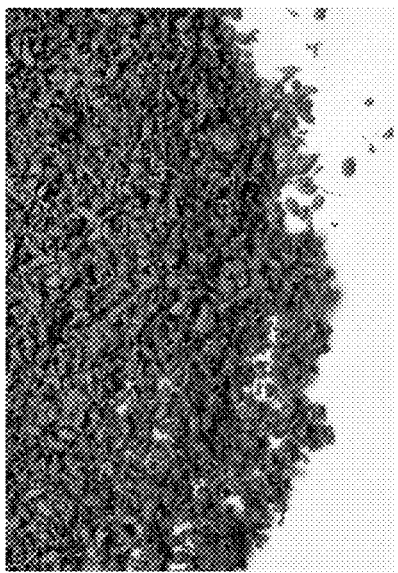
FIGS. 9 and 11 are photographs showing twisted, curled, clumped and rolled particles of a type represented in FIG. 1, FIGS. 10 and 12 are photographs showing twisted, curled, clumped and rolled fibers of a type represented in FIG. 1.
Figure 11:
Figure 13:
FIG. 13 is a photograph comparing individual fibers and particles of the types represented in FIG. 1 and shown in FIGS. 9 through 12.

Grinding/milling processes applied as described above to the manufacturing the bulk material 10 appears to alter the fiber structure of the feed material (e.g., recycled newspaper) to create materials 12 having a desirable combination of properties, including high porosity and low bulk density. Increased porosity promotes oxygen exchange to the roots of plants and enhances availability of water. Low bulk density provides ease of handling and reduces shipping costs. FIGS. 9 and 11 are photographs of rolled particles 12B produced in accordance with the above description, FIGS. 10 and 12 are photographs of rolled fibers 12A produced in accordance with the above description, and FIG. 13 is a photograph showing a side by side comparison of the two. Significant features of the rolled fibers 12A and rolled particles 12B that can be seen in these images include a clumped, curled, twisted, and rolled, rearranged cellulose material having a consistent, milled fiber size or particle size that is favorable to achieving a uniform moisture-holding, oxygen-holding and fertilizer-holding capacity, promoting the use of rolled particles 12B and particularly the rolled fibers 12A as an absorbent material or chemical carrier. The clumped, curled, and twisted shape of the cellulose material can also promote the use of a mass of the rolled fibers 12A and/or rolled particles 12B as a filtering material. Unseen in FIGS. 9 through 13, but determined by other methods, was high porosity characterized by a consistent pore space that is critical to a more uniform moisture-holding, oxygen-holding, fertilizer-holding, or filtering capacity, and a moisture-holding capacity that exceeds by up to about 170% by weight that of long fiber sphagnum peat moss without a surfactant or wetting agent. Significantly, the increased moisture retention and oxygen exchange likely increase the reliability of seed germination, for example, up to about 97% in experimental trials.

Figure 14:
FIG. 14 is a comparative photograph of sphagnum peat moss.

In contrast, significant features of peat moss that can be seen in FIG. 14 include a lack of consistent particle size, and a flat fiber structure that has been expanded as the result of the application of a surfactant. As known in the art, peat moss must have a surfactant or wetting agent to promote moisture retention. In contrast, the rolled fibers 12A and rolled particles 12B have been shown to have an affinity for water, and readily absorb water when very dry.

From the above, it can be seen that a significant advantage of this invention is that the bulk materials 10 can be selectively produced from similar materials, yet have different characteristics that render them particularly suitable as substitutes for either sphagnum peat moss or milled peat moss.

While the invention has been described in terms of specific embodiments, it is apparent that other forms could be adopted by one skilled in the art, such as by modifying the shape of the rolled fibers 12A or rolled particles 12B, utilizing different sources of cellulose fluff material, adding adjuncts during blending which do not materially alter the desired physical and/or textural properties of the materials 10 and their rolled fibers 12A and rolled particles 12B, altering or modifying the processing steps described above yet achieving the desired rolled fibers 12A or rolled particles 12B described, or employing the material 10 for purposes other than a substitute for peat moss. Accordingly, it should be understood that the invention is not limited to the specific embodiments illustrated in the Figures. It should also be understood that the phraseology and terminology employed above are for the purpose of disclosing the illustrated embodiments, and do not necessarily serve as limitations to the scope of the invention. Therefore, the scope of the invention is to be limited only by the following claims.

The invention claimed is:

1. A process for forming a bulk material for use in the horticulture industry as a substitute for sphagnum peat moss, the bulk material comprising porous individual materials, each porous individual material comprising a core and abrasive granular particles (SGPs) that comprise a solid material and are dispersed in the core, the core having an external structure comprising twisted, curled, and clumped shapes that form rolled and coiled overlapping portions of the core, an internal fibrous structure, and porosity characterized by internal pores between the rolled and coiled overlapping portions of the core for moisture-holding, the process comprising:
combining and moistening the SGPs and shredded fragments of a cellulose material with at least one liquid; and
mixing the shredded fragments and the SGPs for a duration so that the SGPs grind the shredded fragments to produce the porous individual materials and permit separation of the porous individual materials in the bulk material, wherein the cores of the porous individual materials are twisted and curled around the SGPs, and the SGPs do not form a cohesive layer that encases the core but instead are individually distributed and dispersed throughout internal fibrous structures and external structures of the cores and between the rolled and coiled overlapping portions of the cores, wherein at least some of the SGPs are confined within the cores.

2. The process as recited in claim 1, further comprising drying the porous individual material to promote separation and handling thereof.

3. The process as recited in claim 2, wherein the bulk material has a bulk density of 70 to 150 grams per liter.

4. The process as recited in claim 1, wherein the SGPs are a size of about 1/16 to about 1 mm.

5. The process as recited in claim 1, wherein the SGPs comprise gypsum.

6. The process as recited in claim 1, wherein the largest dimensions of the porous individual materials do not exceed eight millimeters.

7. The process as recited in claim 1, further comprising promoting moisture retention and enhancing aeration in a soil by mixing the bulk material into the soil.

8. The process as recited in claim 1, further comprising using the bulk material as media for a propagation application.

9. The process as recited in claim 1, further comprising using the bulk material as media for a seed starting application.

10. The process as recited in claim 1, further comprising using the bulk material as media for a rooting application.

11. The process as recited in claim 1, further comprising using the bulk material, the solid material of the SGPs remaining solid during use of the bulk material.

12. The process as recited in claim 1, further comprising using the bulk material, the solid material of the SGPs fragmenting or dissolving during the use of the bulk material.

13. The process as recited in claim 1, wherein the SGPs comprise one or more of hoof and horn materials, ground shells, ground pits, ground seeds, coffee grounds, chaff, hulls, brewery waste, granulated products of fermenting and fuel production, ground or processed forestry products, calcined clay, sand, fused earth products, pumice, volcanic ash, perlite, vermiculite, gypsum, lime, fertilizer, coal fines, rock dust, ground glass, concrete, asphalt, metal, food service containers, solidified fibers, plastics, and processed plastics.

14. A process for forming a bulk material for use in the horticulture industry as a substitute for sphagnum peat moss, the process comprising:
combining and sufficiently moistening abrasive granular particles (SGPs) and shredded fragments of a cellulose material with at least one liquid to form a slurry; and
mixing the slurry of the shredded fragments and the SGPs for a duration so that the SGPs grind the shredded fragments to produce porous individual materials and permit separation of the porous individual materials in the bulk material, wherein cores of the porous individual materials are twisted and curled around the SGPs, and the SGPs do not form a cohesive layer that encases the core but instead are individually distributed and dispersed throughout internal fibrous structures and external structures of the cores and between rolled and coiled overlapping portions of the cores, wherein at least some of the SGPs are confined within the cores.

15. The process as recited in claim 14, further comprising drying the porous individual material to promote separation and handling thereof.

16. The process as recited in claim 14, wherein the bulk material has a bulk density of 70 to 150 grams per liter.

17. The process as recited in claim 14, wherein the SGPs are a size of about $1/16$ to about 1 mm.

18. The process as recited in claim 14, wherein the SGPs comprise gypsum.

19. The process as recited in claim 14, wherein the largest dimensions of the porous individual materials do not exceed eight millimeters.

20. The process as recited in claim 14, wherein the mixing causes some of the SGPs to be absorbed into overlapping portions of the core.

* * * * *